United States Patent
Kuo et al.

(10) Patent No.: US 8,920,706 B2
(45) Date of Patent: Dec. 30, 2014

(54) METHOD FOR HOT ISOSTATIC PRESSING A SUBSTRATE

(75) Inventors: Yang-Kuao Kuo, Taoyuan County (TW); Chia-Yi Hsiang, Taoyuan County (TW); Ching-Hui ChiangLin, Taoyuan County (TW); Fu-Hsing Huang, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 742 days.

(21) Appl. No.: 13/238,173

(22) Filed: Sep. 21, 2011

(65) Prior Publication Data
US 2013/0032965 A1 Feb. 7, 2013

(30) Foreign Application Priority Data
Aug. 4, 2011 (TW) .............................. 100127700 A

(51) Int. Cl.
| | |
|---|---|
| C04B 35/645 | (2006.01) |
| C04B 35/581 | (2006.01) |
| B01J 3/06 | (2006.01) |
| B22F 3/15 | (2006.01) |

(52) U.S. Cl.
CPC ................ B01J 3/06 (2013.01); C04B 35/581 (2013.01); C04B 35/6455 (2013.01); B01J 2203/067 (2013.01); B22F 2003/153 (2013.01); C04B 2235/658 (2013.01)
USPC .......................................................... 264/604

(58) Field of Classification Search
CPC .............. C04B 35/581; C04B 35/6455; B22F 2003/153
USPC .......................................................... 264/604
See application file for complete search history.

(56) References Cited

U.S. PATENT DOCUMENTS

| | | | | |
|---|---|---|---|---|
| 2,007,567 | A | * | 7/1935 | Fischer ........................... 425/84 |
| 4,983,339 | A | * | 1/1991 | Boncoeur et al. .............. 264/604 |
| 5,116,589 | A | * | 5/1992 | Hoenig .......................... 264/102 |
| 5,191,508 | A | * | 3/1993 | Axelson et al. ................ 361/257 |

* cited by examiner

*Primary Examiner* — Yogendra Gupta
*Assistant Examiner* — Erin Snelting
(74) *Attorney, Agent, or Firm* — Jackson IPG PLLC

(57) ABSTRACT

Disclosed is a method for hot isostatic pressing a substrate. At first, a metal container is provided. Powder is filled in the metal container before the metal container is located in an oven. The metal container is subjected to isostatic pressing that includes heating and pressing. Thus, the metal container shrinks and presses on the powder evenly and turns the powder into a nugget. The metal container is moved out of the oven and broken to release the nugget. A substrate is cut from the nugget. With the hot isostatic pressing, the substrate exhibits only a few flaws and is large, fine, homogenous and strong so that the substrate is not vulnerable to deformation in a high-pressure environment.

6 Claims, 5 Drawing Sheets

METHOD FOR HOT ISOSTATIC PRESSING A SUBSTRATE

BACKGROUND OF INVENTION

1. Field of Invention

The present invention relates to a method for making an aluminum nitride substrate and, more particularly, to a method for hot isostatic pressing an aluminum nitride substrate.

2. Related Prior Art

Conventional LED devices include substrates made of gallium nitride (GaN) or sapphire ($Al_2O_3$) that emits blue light. A sapphire substrate is however poor regarding thermal conductivity as its heat transfer coefficient is only 17 to 27 W/mK. Therefore, a serious problem related to heat radiation would be encountered when a large current is used to drive an LED device equipped with a sapphire substrate.

On the contrary, an aluminum nitride ("AlN") substrate is excellent regarding thermal conductivity as its heat transfer coefficient is 170 to 230 W/mK. The thermal conductivity of an aluminum nitride substrate is seven times higher than the thermal conductivity of an aluminum oxide substrate. An aluminum nitride substrate hence lasts much longer than an aluminum oxide substrate. Accordingly, the life of an LED device equipped with an aluminum nitride substrate is about 6,000 to 7,000 hours. Moreover, an aluminum nitride substrate is highly electrically isolative, erosion-resistant and refractory, and exhibits stable physical properties. Hence, an aluminum nitride substrate is suitable for use in a high power electronic element.

To make an aluminum nitride substrate, aluminum nitride powder is made into a blank with a predetermined shape, size and strength. The forming of the blank is an important step in a process for making an aluminum nitride substrate. To form the blank, tape casting (or "doctor-blading") may be used. The tape casting is simple but cannot be used to make a large aluminum nitride substrate. Moreover, the porosity of an aluminum nitride substrate made by the tape casting is poor so that the thermal conductivity of the aluminum nitride substrate is poor.

The present invention is therefore intended to obviate or at least alleviate the problems encountered in prior art.

SUMMARY OF INVENTION

It is the primary objective of the present invention to provide a method for hot isostatic pressing a substrate.

To achieve the foregoing objective, the method includes the steps of providing a metal container and filling powder in the metal container. Then, there is provided an oven for containing and hot isostatic pressing the metal container filled with the powder to deform the metal container evenly to press the powder evenly into a nugget. Then, the metal container is removed from the oven, the metal container is broken, the nugget is removed from the metal container, and the nugget is sliced into a plurality of substrates.

In an aspect, the metal container is made of a refractory material.

In another aspect, the metal container includes a feeding pipe, a cover and a check valve. The feeding pipe is in communication with the metal container. The cover is used for closing the feeding pipe and includes a plurality of vents defined therein. The check valve is provided between the feeding pipe and the cover. The check valve is used together with the vents for venting extra gas from the metal container during the hot isostatic pressing.

In another aspect, the check valve includes a membrane and a spring. The membrane is movably provided on the feeding pipe. The spring is compressed between the cover and the membrane.

In another aspect, the powder is made of aluminum nitride so that the nugget is made of aluminum nitride and that the substrates are made of aluminum nitride substrate.

In another aspect, the temperature is 1000° C. to 3000° C. and the pressure is 6894800 Pa to 275792000 Pa in the oven for hot isostatic pressing the metal container.

In another aspect, the method further includes the step of introducing an inert gas into the oven during the hot isostatic pressing. The inert gas is used as a medium for exerting even pressure on the metal container.

The method for hot isostatic pressing a substrate in accordance with claim 7, wherein the inert gas is selected from the group consisting of $Ar_{(g)}$ and $N_{2(g)}$.

Other objectives, advantages and features of the present invention will be apparent from the following description with reference to the attached drawings.

BRIEF DESCRIPTION OF DRAWINGS

The present invention will be described via detailed illustration of the preferred embodiment with reference to the drawings wherein.

DETAILED DESCRIPTION OF PREFERRED EMBODIMENT

Figure 1:
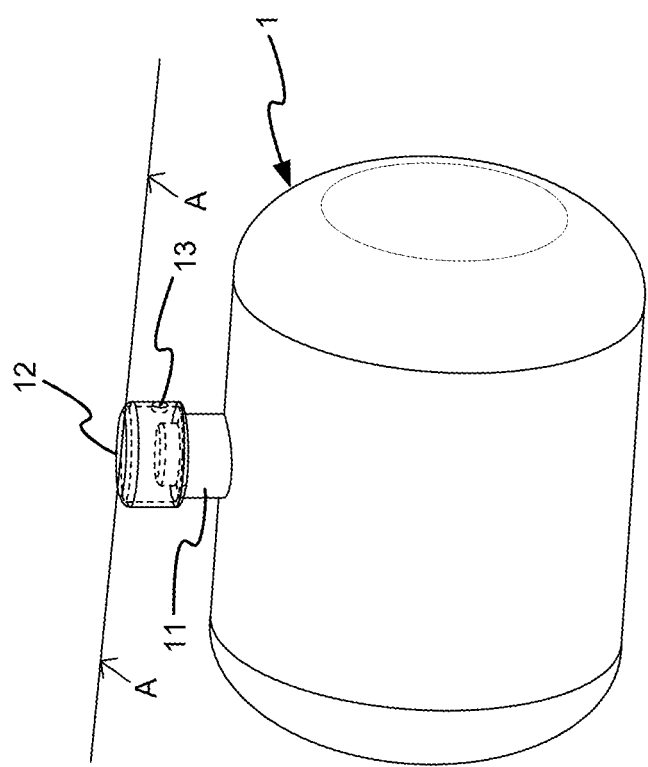
FIG. 1 is a perspective view of a metal container used in a first step of a method for hot isostatic pressing a substrate in accordance with the preferred embodiment of the present invention.
Figure 2:
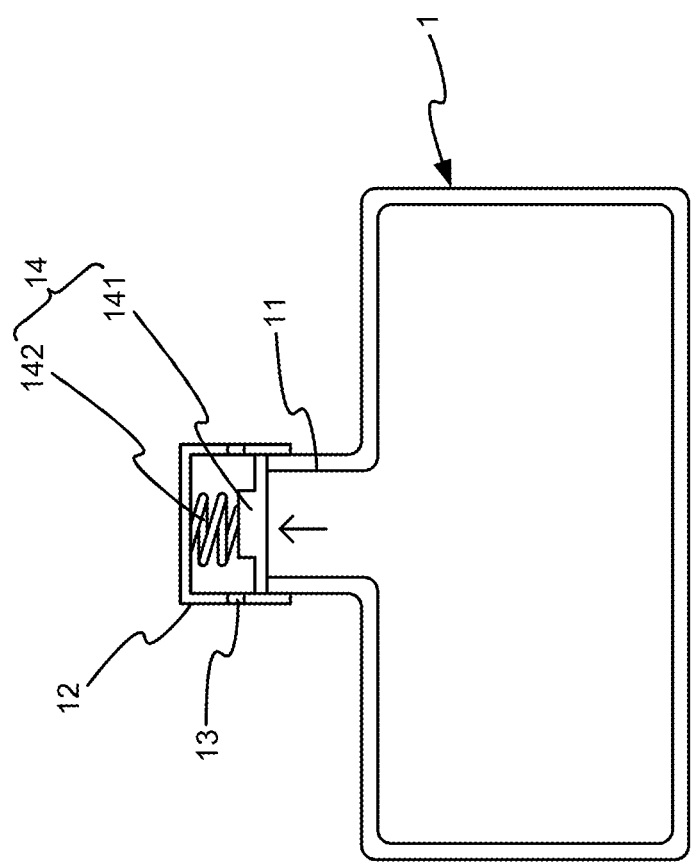
FIG. 2 is a cross-sectional view of the metal container taken along a line A-A shown in FIG. 1.

With reference to FIGS. 1 through 5, there is shown a method for hot isostatic pressing a substrate in accordance with the preferred embodiment of the present invention. With reference to FIGS. 1 and 2, there is provided a metal container 1. The metal container 1 is made of a refractory material. The metal container 1 is in the form of a barrel and includes a feeding pipe 11 and a cover 12. The feeding pipe 11 is formed on or connected to the metal container 1 so that a channel defined in the feeding pipe 11 is in communication with a space defined in the metal container 1. The cover 12 is used for closing the feeding pipe 11. The cover 12 includes a plurality of vents 13 defined in the periphery thereof. There is provided a check valve 14 between feeding pipe 11 and the cover 12. The check valve 14 includes a membrane 141 and a spring 142. The membrane 141 is movably provided on the feeding pipe 11 while the spring 142 is compressed between the cover 12 and the membrane 141. Thus, the membrane 141 is normally abutted against the feeding pipe 11 because of the spring 142.

Figure 3:
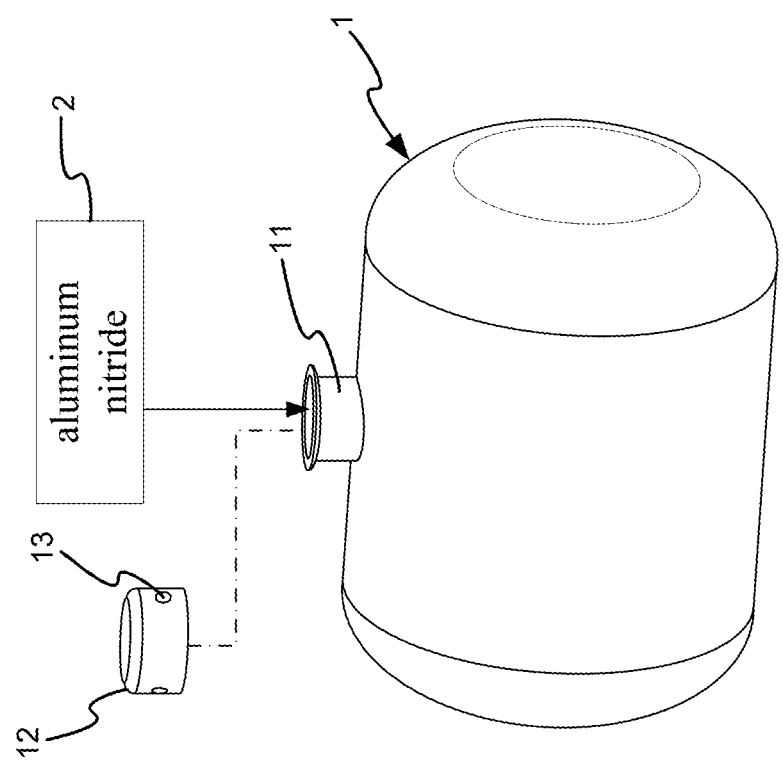
FIG. 3 is a perspective view of the metal container at a second step of the method shown in FIG. 1.

With reference to FIG. 3, powder 2 is filled into the metal container 1 through the feeding pipe 11. Then, the feeding pipe 11 is closed by the cover 12. The powder 2 is preferably made of aluminum nitride.

Figure 4:
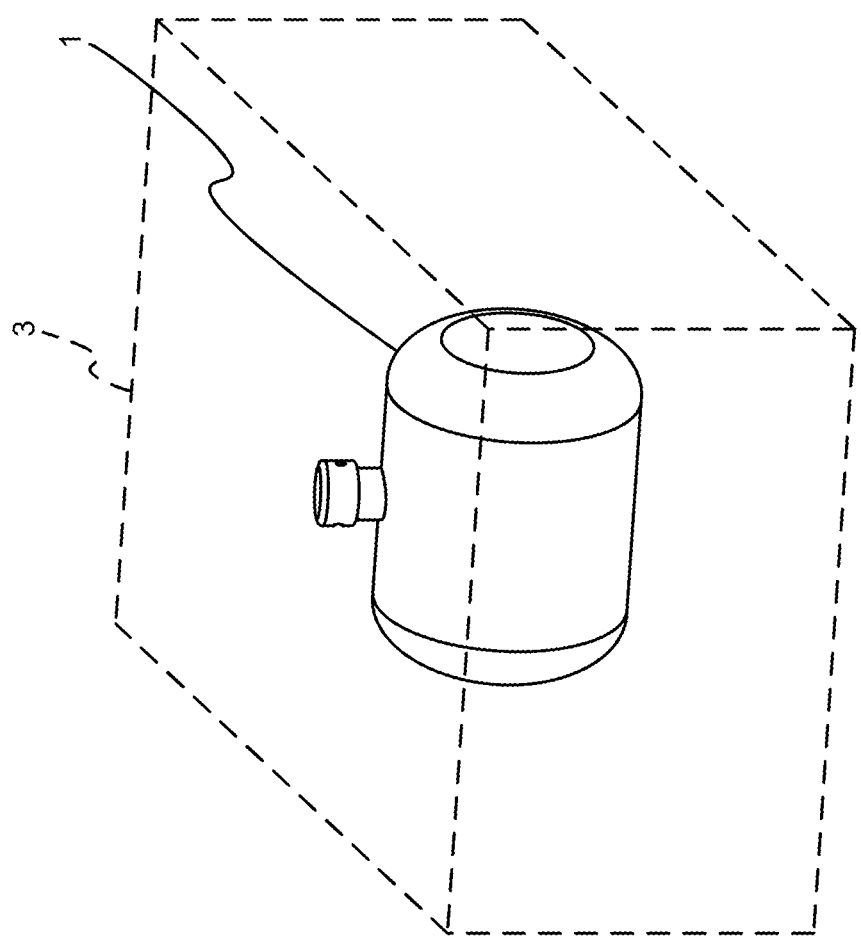
FIG. 4 is a perspective view of the metal container at a third step of the method shown in FIG. 1.

With reference to FIG. 4, the metal container 1, in which the powder 2 is filled, is provided in an oven 3. In the oven 3, the metal container 1 is subject to hot isostatic pressing. In the hot isostatic pressing, the temperature is 1000° C. to 3000° C. and the pressure is 6894800 Pa to 275792000 Pa. During the hot isostatic pressing, an inert gas such as $Ar_{(g)}$ and $N_{2(g)}$ is introduced into the oven 3 as an medium to exert even pressure on the metal container 1 to evenly deform the metal container 1 to therefore evenly press the powder 2. Thus, the powder 2 is made into a nugget 2a. During the hot isostatic pressing, extra gas or air is released from the metal container 1 against the membrane 141 biased by the spring 142 and finally vented by the vent 13. After the extra gas or air is released from the metal container 1, the membrane 141 is abutted against the feeding pipe 11 by the spring 142 again so that the inert gas cannot go into the metal container 1 from the oven 3.

Figure 5:
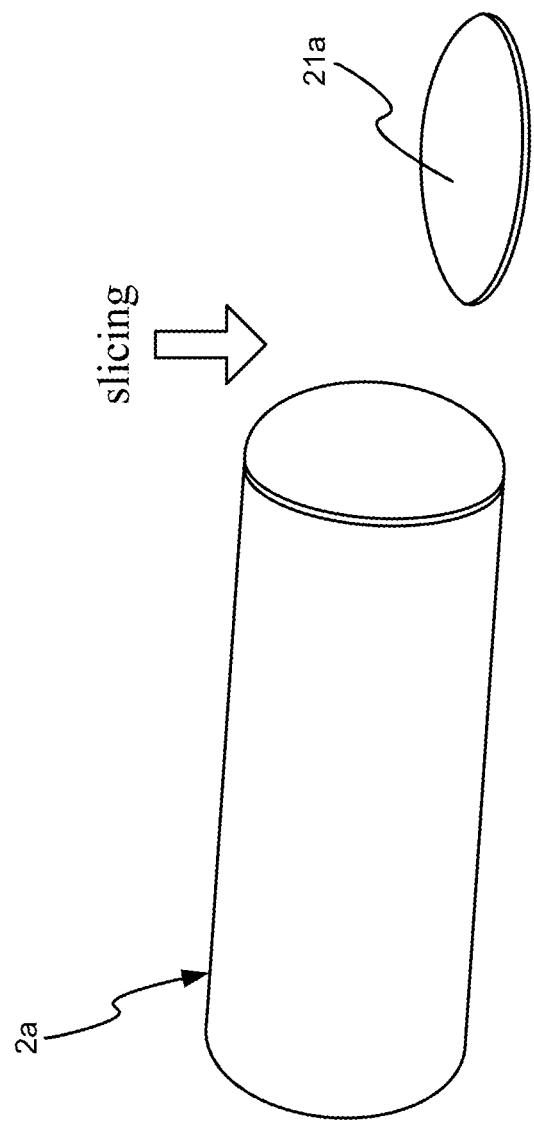
FIG. 5 is a perspective view of the metal container at a fourth step of the method shown in FIG. 1.

With reference to FIG. 5, the metal container 1 is removed from the oven 3. Then, the metal container 1 is broken so that the nugget 2a can be removed from the metal container 1. Finally, the nugget 2a is sliced into a plurality of substrates 21a with predetermined thickness.

As described above, in accordance with the present invention, the hot isostatic pressing is used together with the metal container 1 to press the powder 2 evenly. Thus, porosity-related defects are removed from the powder 2 and the porosity is improved. The porosity of the powder 2 can be adjusted by adjusting the pressure in the hot isostatic pressing. The heat and pressure are exerted on powder 2 evenly from all sides. Thus, the substrates 21a are not vulnerable to cracks under high pressure. Thus, there are few defects in the substrates 21a, the substrates 21a exhibit excellent porosity, homogeneity and strength. Therefore, the method of the present invention can be used to make large substrates that survive high pressure.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for hot isostatic pressing a substrate including the steps of:

providing a metal container in the form of a barrel, a feeding pipe connected to the metal container, a cover closing the feeding pipe and with a plurality of vents defined therein, and a check valve arranged between the feeding pipe and the cover;

filling powder in the metal container;

providing an oven containing, heating, and hot isostatic pressing the metal container filled with the powder so as to heat and deform the metal container evenly to press the powder evenly into a nugget and such that excess gasses from the metal container are vented from the container and external gases are blocked from entering the container during the hot isostatic pressing;

removing the metal container from the oven;

breaking the metal container;

removing the nugget from the metal container; and slicing the nugget into a plurality of substrates.

2. The method for hot isostatic pressing a substrate in accordance with claim 1, wherein the check valve includes:

a membrane movably provided on the feeding pipe; and a spring compressed between the cover and the membrane.

3. The method for hot isostatic pressing a substrate in accordance with claim 1, wherein the powder is made of aluminum nitride so that the nugget is made of aluminum nitride and that the substrates are made of aluminum nitride substrate.

4. The method for hot isostatic pressing a substrate in accordance with claim 1, wherein the temperature is 1000° C. to 3000° C. and the pressure is 6894800 Pa to 275792000 Pa in the oven for hot isostatic pressing the metal container.

5. The method for hot isostatic pressing a substrate in accordance with claim 1, further including the step of introducing an inert gas, as a medium for exerting even pressure on and evenly deforming the metal container so as to evenly press the powder, into the oven during the hot isostatic pressing.

6. The method for hot isostatic pressing a substrate in accordance with claim 5, wherein the inert gas is selected from the group consisting of $Ar_{(g)}$ and $N_{2(g)}$.

* * * * *